Aug. 19, 1969 H. HIERONYMUS 3,462,673

TEMPERATURE-COMPENSATED MAGNETICALLY VARIABLE POTENTIOMETER

Filed March 21, 1967

United States Patent Office 3,462,673

Patented Aug. 19, 1969

3,462,673

TEMPERATURE-COMPENSATED MAGNETICALLY VARIABLE POTENTIOMETER

Hans Hieronymus, Erlangen, Germany, assignor to Siemens Aktiengesellschaft, Berlin, Germany, a corporation of Germany Filed Mar. 21, 1967, Ser. No. 624,753

Claims priority, application Germany, Mar. 30, 1966, S 102,897

Int. Cl. H01c 1/16, 7/16; G05f 1/10

U.S. Cl. 323—69 3 Claims

ABSTRACT OF THE DISCLOSURE

A magnetically variable potentiometer has end contacts and a center contact positioned intermediate the end contacts and equidistant therefrom. A first input terminal is connected to one of the end contacts. A second input terminal and a first output terminal are connected to the other of the end contacts. A second output terminal is connected to the center contact. A pair of substantially identical thermistors temperature-compensates the magnetically variable potentiometer. A first thermistor of the pair of thermistors is connected between the first input terminal and the one of the end contacts. The second of the pair of thermistors is connected between the second input terminal and the other of the end contacts.

DESCRIPTION OF THE INVENTION

The present invention relates to a magnetically variable potentiometer. More particularly, the invention relates to a temperature compensated magnetically variable potentiometer.

A galvanomagnetic semiconductor resistor of indium antimonide is known as a field plate. Field plates of this type are described, for example, in the Zeitschrift für Physik, vol. 176, 1963, pages 399 to 408. A potentiometer is provided by varying a magnetic field relative to a field plate. Such a potentiometer provides variable contact-free resistances, as described, for example, in German Patent No. 1,013,880 and in U.S. Patent No. 2,712,-601. The electrical resistance of a field plate reaches a maximum when the entire field plate is in the magnetic field, that is, when the magnetic field is a maximum relative to the field plate. The electrical resistance of a field plate is a minimum when the field plate is entirely removed from the magnetic field, that is, when the magnetic field is a minimum relative to the field plate.

A magnetically variable potentiometer generally comprises two field plates or one field plate having a midpoint or center tap. The input voltage is applied across the entire field plate and the output voltage is derived from the center tap and an end contact. The ratio of the output voltage to the input voltage may be continually varied by variation of the magnetic field relative to the field plate.

A disadvantage of a magnetically variable potentiometer is the dependence of its output voltage to input voltage ratio on temperature.

The principal object of the present invention is to provide a new and improved magnetically variable potentiometer. The magnetically variable potentiometer of the present invention is temperature-compensated. The potentiometer of the present invention thus overcomes the disadvantage of known magnetically variable potentiometers.

In accordance with the present invention, a temperature-compensated magnetically variable potentiometer comprises a magnetically variable potentiometer having end contacts and a center contact positioned intermediate the end contacts and equidistant therefrom. A first input terminal is connected to one of the end contacts. A second input terminal and a first output terminal are connected to the other of the end contacts. A second output terminal is connected to the center contact. A first thermistor is connected between the first input terminal and the one of the end contacts. A second thermistor is connected between the second input terminal and the other of the end contacts. The first and second thermistors temperature-compensate the magnetically variable potentiometer. The first and second thermistors are substantially identical.

In one embodiment of the invention, the magnetically variable potentiometer comprises a single unitary semiconductor body having an axis and means for applying a magnetic field to the semiconductor body movable in axial directions. In a modification of the invention, the magnetically variable potentiometer comprises a pair of substantially identical semiconductor bodies electrically connected in series and having a common axis. The center contact is electrically connected to the electrical connection between the semiconductor bodies. A magnetic field is applied to the semiconductor bodies and is movable in axial directions.

The temperature coefficient of the thermistors may be positive or negative, having the same or the opposite polarity as the semiconductor body.

In accordance with the present invention, the resistance values of the thermistors utilized to compensate for temperature variation are readily computed.

In order that the present invention may be readily carried into effect, it will now be described with reference to the accompanying drawing, wherein.

Figure 1:
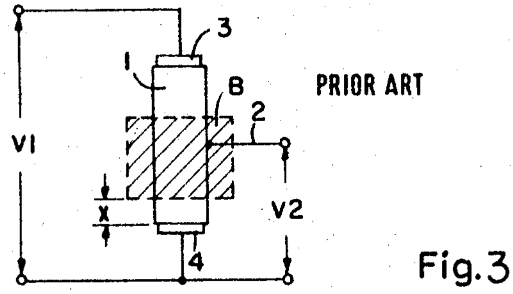
Fig.1 PRIOR ART
FIG. 1 is a schematic diagram of a magnetically variable potentiometer of the prior art.
Figure 2:
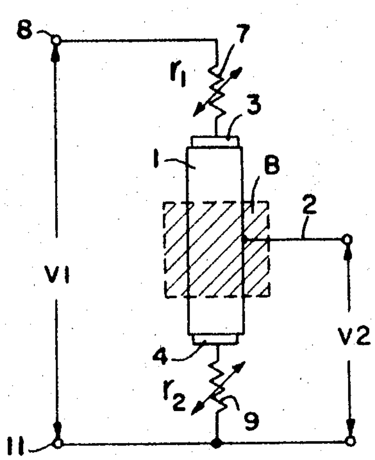
FIG. 2 is a schematic diagram of an embodiment of the variable potentiometer of the present invention.
Figure 4:
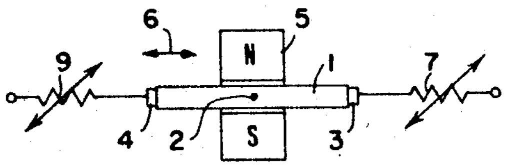
FIG. 4 is a schematic diagram of the embodiment of FIG. 2 disclosing a magnet for providing a magnetic field.

In FIGS. 1, 2 and 4, a unitary single semiconductor body 1 has a center or midpoint tap 2 and end contacts, taps or electrodes 3 and 4. A magnetic field B, indicated by a cross-hatched broken line rectangle, is applied to the semiconductor body 1 by any suitable means such as, for example, a magnet 5 (FIG. 4), and is movable along the axis of said semiconductor body in the direction indicated by an arrow 6.

An input voltage V1 is applied across the end contacts 3 and 4 of the semiconductor body 1 and an output voltage V2 is derived from the center tap 2 and the end contact 4, in FIG. 1. The semiconductor body 1 has a length L in its axial direction. The magnetic field B should extend for half the length of the semiconductor body 1, so that it should extend for $L/2$. The distance of the closer edge of the magnetic field from the contact 4 is indicated by $x$ (FIG. 1), wherein $x$ is equal to or greater than zero and equal to or less than $L/2$.

If the temperature coefficient of the semiconductor body is the same whether or not a magnetic field is applied thereto, the voltage divider ratio S, which is $V2/V1$, is dependent of the temperature for each value of $x$, In conventional field plates this is only approximately so, since the temperature coefficient always depends upon the magnet field or magnetic inductance B.

The temperature coefficient of a field plate is almost always negative and is less in the absence of a magnetic field than in the presence of a magnetic field. When the temperature increases, the resistance R42 between the contacts or taps 4 and 2 of the semiconductor body 1 decreases relatively more than the resistance R23 between the contacts or taps 2 and 3 of said semiconductor body, when $x=o$. Thus, in the magnetically variable potentiometer of the prior art (FIG. 1) a negative temperature coefficient of the output voltage V2, and therefore of the voltage divider ratio S, is provided.

In FIG. 2, in accordance with the present invention, a first thermistor 7 is connected between the end contact 3 and the input terminal 8 and has a resistance $r_1$ and a second thermistor 9 is connected between the end contact 4 and the input terminal 11 and has a resistance $r_2$. The remainder of the arrangement of FIG. 2 is identical with that of FIG. 1. The thermistors 7 and 9 are thus connected in series with the semiconductor body 1.

In FIG. 2, with the magnetic field in the position illustrated, an approximately large negative temperature coefficient of the first thermistor 7 decreases the smaller resistance R23 plus $r_1$ to a considerably greater extent than the larger resistance R42 plus $r_2$ is decreased by the second thermistor 9. The output voltage V2 is increased, but the negative temperature coefficient of the potentiometer is compensated.

If the magnetic field B is positioned with its closer edge a distance of $L/2$ from the contact 4, so that $x=L/2$ and said magnetic field covers the half of the semiconductor body 1 which is adjacent the contact 3, the resistance R42 is decreased to a lesser extent than the resistance R23 during an increase in temperature, so that a positive temperature coefficient is provided without compensation. The decrease of the resistance $r_2$ of the second thermistor 9 has a greater effect upon the resistance R42 than the decrease of the resistance $r_1$ of the first thermistor 7 has upon the larger resistance R23, so that the positive temperature coefficient of V2 is reduced in magnitude.

In accordance with the present invention, the first and second thermistors 7 and 9 have equal resistances. The resistances of the thermistors 7 and 9 are readily calculated by providing the following symbols and definitions.

$R_o$ is the resistance of one half the semiconductor body 1 in the absence of a magnetic field and at room temperature, $w$ is the factor of the resistance variation of the semiconductor body 1 in the magnetic field; that is, the ratio of the resistance in a magnetic field to the resistance in the absence of a magnetic field and at room temperature, $a$ is the temperature coefficient of the field plate in the absence of a magnetic field and at room temperature, $b$ is the temperature coefficient of the field plate in a magnetic field and at room temperature, $r_o$ is the basic resistance of the first and second thermistors at room temperature, $t$ is the temperature difference between the actual temperature and room temperature, and $c$ is the temperature coefficient of the first and second thermistors at room temperature.

The foregoing values are utilized to calcuate the temperature-dependent resistances R42 and R43, which resistance R43 is the resistance of the semiconductor body 1 between the contacts 4 and 3 thereof. If the variation of the resistance $r$ of the thermistors with the temperature difference $t$ is a linear function, the resistance $r$ of the thermistors may be indicated as a function of the temperature. Thus, (1) $$R_{42}=R_o[2x(1+ta)+w(1-2x)(1+tb)]$$

(2) $$R_{43}=R_o[1+ta+w(1+tb)]$$

(3) $$r=_o(1+tc)$$

The voltage divider ratio S may be derived from Equations 1, 2 and 3. Thus, (4) $$S=\frac{R_{42}+r}{R_{43}+2r}$$

(5) $$S=\frac{t[R_o(2xa+wb-2xwb)]+r_oc+R_o(w+2x-2xw)+r_o}{tR_o(a+wb)+2r_oc+R_o(1+w)+2r_o}$$

(6) $$S=\frac{t(A+B)}{t(C+D)}$$

A, B, C and D are terms of Equation 5 which do not depend upon the temperature difference $t$.

If the temperature coefficient of the voltage divider ratio S is to be eliminated, then $dS/dt$ should be equal to zero. Thus, (7) $$\frac{dS}{dT}=\frac{[(tC+D)][A-(tA+B)C]}{[(t)(C+D)]^2}=0$$

(8) $$(D)(A)-(B)(C)=0$$

(9) $$[R_o(1+w)+2r_o][R_o(2xa+wb-2wxb)+r_oc] -[R_o(2x+w-2wx)+r_o][R_o(a+wb)+2r_oc]=0$$

(10) $$(4x-1)[R_ow(a-b)+R_1w(c-b)+R_1(a-c)]=0$$

The basic thermistor resistance $r_o$ is then

(11) $$r_o=\frac{w(a-b)}{w(b-c)+c-a}(R_o)$$

When the material constants $a$ and $b$ are known, within a specific temperature range, for a specific field plate, and $w$ is selected as greater than 1, the temperature coefficient $c$ of the thermistors may always be determined for a basic thermistor resistance $r_o$ greater than zero. Since the basic thermistor resistance $r_o$ is an ohmic resistance, it must be positive.

The thermistor resistance is thus calculated in accordance with the present invention. The calculated thermistor resistance per Equation 11 applies to temperature ranges in which the resistance of the field plate and the resistance of the thermistors vary linearly with temperature. The temperature coefficient of the magnetically variable potentiometer is substantially fully compensated for in such temperature ranges. This is also the case for a temperature responsive magnetic inductance, that is, for example, the coercive force of the excitation magnet. In such case, only magnitude $b$ varies. This may be considered when calculating the thermistor resistance $r_o$.

In order to further illustrate the present invention, the thermistor resistance for each of three potentiometers, comprising three different types of semiconductor material, are calculated in the following three examples.

EXAMPLE 1

The conductivity of the semiconductor material is 200 ohm-cm.$^{-1}$;

$a=-1.8\%$ per degree C.;
$b=-2.9\%$ per degree C.; and
$w=10$.

Then,

| $c$ in percent per degree C.: | $r_o/R_o$ |
|---|---|
| −6 | 0.41 |
| −5 | 0.5 |
| −4 | 0.62 |
| −3.02 | α |

It is thus seen that the thermistors should have a large temperature coefficient. The ratio $S$ max./$S$ min. of 10/1 is decreased only slightly, to 7/1, if there is no compensation and the thermistor temperature coefficient is −5% per degree C.

EXAMPLE 2

The conductivity of the semiconductor material is 500 ohm-cm.$^{-1}$;

$a=-0.12\%$ per degree C.;
$b=-0.5\%$ per degree C.;
$w=10$.

Then,

| $c$ in percent per degree C.: | $r_0/R_0$ |
|---|---|
| −6 | 0.077 |
| −5 | 0.095 |
| −4 | 0.122 |
| −3 | 0.172 |
| −2 | 0.29 |

If the thermistors have a temperature coefficient of −5% per degree C., the ratio $S$ max./$S$ min. is decreased only very slightly, to 9.22/1.

EXAMPLE 3

The conductivity of the semiconductor material is 1000 ohm-cm.$^{-1}$;

$a=+0.06\%$ per degree C.;
$b=-0.09\%$ per degree C.;
$w=10$.

Then,

| $c$ in percent degree C.: | $r_0/R_0$ |
|---|---|
| −6 | 0.028 |
| −5 | 0.034 |
| −4 | 0.043 |
| −3 | 0.058 |
| −2 | 0.088 |

In Example 3, the voltage distribution ratio varies to 9.7/1, which is a variation of only 3% compared to the non-compensated potentiometer when $c$ is −5% per degree C. Temperature compensation may be accomplished if the plus and minus signs of $a$ and $b$ or $a$ and $c$ are different. However, $a$, $b$, $c$ and $w$ should always be selected so that $r_0$, per Equation 11, remains greater than zero.

As indicated by the foregoing calculations, the potentiometer of the present invention having equal resistances completely temperature-compensated, and the compensation of the temperature range is also independent of the varied or adjusted voltage division.

A semiconductor having a strong magnetic field response is suitable as the field plate of the magnetically variable potentiometer of the present invention. The known $A^{III}B^{V}$ compounds of the elements of the third and fifth groups of the Periodic Table comprise suitable semiconductors.

A very strong magnetic field response is provided if inclusions of good electrical conductivity are embedded in the semiconductor body in parallel alignment with each other. The inclusions may comprise, for example, needles of nickel antimonide in indium antimonide.

Figure 3:
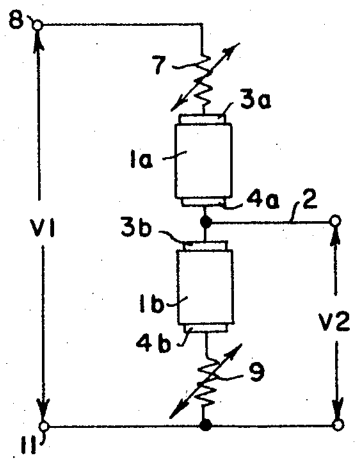
FIG. 3 is a schematic diagram of a modification of the embodiment of FIG. 2.

In the modification of FIG. 3, the magnetically variable potentiometer comprises a pair of substantially identical semiconductor bodies 1*a* and 1*b* instead of the single unitary semiconductor body 1 of FIGS. 1, 2 and 4. The first semiconductor body 1*a* has first and second end contacts, taps or terminals 3*a* and 4*a* and the second semiconductor body 1*b* has first and second end contacts, taps or terminals 3*b* and 4*b*.

The first and second semiconductor bodies 1*a* and 1*b* are electrically connected in series by an electrical lead connecting the second end contact 4*a* of said first semiconductor body and the first end contact 3*b* of said second semiconductor body. The first and second semiconductor bodies 1*a* and 1*b* are connected in axial alignment so that they have a common axis. The center contact, tap or electrode 2 is electrically connected to the electrical connection between the first and second semiconductor bodies 1*a* and 1*b*. The first end contact 3*a* of the first semiconductor body 1*a* and the second end contact 4*b* of the second semiconductor body 1*b* are the first and second end contacts of the potentiometer.

The components of FIG. 3, identified by the same reference numerals as the corresponding components of FIGS. 1, 2 and 4, are identical with said corresponding components. The magnetic field is not shown in FIG. 3, although it is present as in FIGS. 1, 2 and 4, in order to maintain the clarity of illustration.

While the invention has been described by means of specific examples and in specific embodiments, I do not wish to be limited thereto, for obvious modifications will occur to those skilled in the art without departing from the spirit and scope of the invention.

I claim:

1. A temperature-compensated magnetically variable potentiometer, comprising a magnetically variable potentiometer having end contacts and a center contact positioned intermediate said end contacts and equidistant therefrom;
a first input terminal connected to one of said end contacts;
a second input terminal and a first output terminal connected to the other of said end contacts;
a second output terminal connected to said center contact;
a first thermistor connected between said first input terminal and said one of such end contacts; and
a second thermistor connected between said second input terminal and said other of said end contacts, said first and second thermistors being substantially identical and temperature-compensating said magnetically variable potentiometer.

2. A temperature-compensated magnetically variable potentiometer as claimed in claim 1, wherein said magnetically variable potentiometer comprises a single unitary semiconductor body having an axis and means for applying a magnetic field to said semiconductor body movable in axial directions.

3. A temperature-compensated magnetically variable potentiometer as claimed in claim 1, wherein said magnetically variable potentiometer comprises a pair of substantially identical semiconductor bodies electrically connected in series and having a common axis, said center contact being electrically connected to the electrical connection between said semiconductor bodies, and means for applying a magnetic field to said semiconductor bodies movable in axial directions.

References Cited

UNITED STATES PATENTS

| | | | |
|---|---|---|---|
| 3,021,459 | 2/1962 | Grubbs et al. | 307—278 X |
| 3,265,959 | 8/1966 | Wiehl et al. | 323—94 |
| 3,286,161 | 11/1966 | Jones et al. | 323—94 |
| 3,320,520 | 5/1967 | Pear | 323—94 X |
| 3,365,665 | 1/1968 | Hood | 324—117 |

JOHN F. COUCH, Primary Examiner

G. GOLDBERG, Assistant Examiner

U.S. Cl. X.R.

307—309; 323—94; 324—105